United States Patent [19]
Wamprecht et al.

[11] Patent Number: 5,508,337
[45] Date of Patent: Apr. 16, 1996

[54] POWDER COATING COMPOSITIONS, A PROCESS FOR THEIR PREPARATION, AND THEIR USE FOR THE COATING OF HEAT RESISTANT SUBSTRATES

[75] Inventors: Christian Wamprecht, Neuss; Reinhard Halpaap, Odenthal-Glöbusch; Hans-Ulrich Méier-Westhues, Leverkusen; Wolfgang Schultz, Krefeld, all of Germany

[73] Assignee: Bayer Aktiengesellschaft, Leverkusen, Germany

[21] Appl. No.: 238,563

[22] Filed: May 5, 1994

Related U.S. Application Data

[63] Continuation-in-part of Ser. No. 13,284, Feb. 4, 1993, abandoned.

[30] Foreign Application Priority Data

Feb. 14, 1992 [DE] Germany ............................ 42 03 876.6

[51] Int. Cl.$^6$ ................. C08J 3/00; C08K 3/20; C08L 75/00; C08F 8/30
[52] U.S. Cl. .................. 524/507; 428/423.1; 525/124; 525/455; 528/45; 528/60
[58] Field of Search .......................... 524/507; 428/423.1; 525/124, 455; 528/45, 60

[56] References Cited

U.S. PATENT DOCUMENTS

| | | | |
|---|---|---|---|
| 3,857,818 | 12/1974 | Frizelle | 260/77.5 TB |
| 3,993,849 | 11/1976 | Victorius | 428/463 |
| 3,998,768 | 12/1976 | Pettit, Jr. | 260/17 R |
| 5,028,682 | 7/1991 | Witzeman et al. | 528/45 |
| 5,095,087 | 3/1992 | Witzeman et al. | 528/45 |

FOREIGN PATENT DOCUMENTS

| | | |
|---|---|---|
| 1412882 | 11/1975 | United Kingdom . |
| 9201757 | 2/1992 | WIPO . |

*Primary Examiner*—Paul R. Michl
*Assistant Examiner*—Patrick NiLand
*Attorney, Agent, or Firm*—Joseph C. Gil; Richard E. L. Henderson

[57] ABSTRACT

The present invention relates to a powder coating composition having a glass transition temperature of 20° to 80° C. and containing (A) 56 to 86.9% by weight of a polyacrylate polyol component having a hydroxyl number of 30 to 155 and a glass transition temperature of 30° to 120° C., (B) 0.1 to 9% by weight of a polyester polyol component having a hydroxyl number of 40 to 180 and a glass transition temperature of −40° to 80° C., (C) 13 to 35% by weight of a polyisocyanate component having a glass transition temperature of −40° to 60° C. and containing at least one ketoxime-blocked polyisocyanate selected from (i) polyisocyanate derivatives prepared from 1,6-diisocyanatohexane and containing biuret, isocyanurate, uretdione, and/or urethane groups, (ii) polyisocyanate derivatives prepared from mixtures of 1,6-diisocyanatohexane and 1-isocyanato-3,3,5-trimethyl-5-isocyanatomethyl-cyclohexane and containing isocyanurate groups and optionally uretdione groups and (iii) polyisocyanate derivatives prepared from 4,4'-diisocyanato-dicyclohexylmethane and containing urethane groups, and (D) at least one catalyst for the reaction between blocked isocyanate groups and hydroxyl groups,
wherein i) the percentages of components (A), (B), and (C) are based on the total weight of these components and ii) components (A), (B), and (C) are present in amounts sufficient to provide an equivalent ratio of blocked isocyanate groups to hydroxyl groups of 0.5:1 to 1.5:1.

The present invention is also relates to a process for the preparation of this powder coating composition and to heat-resistant substrates, particularly automotive body parts, coated with this powder coating composition.

20 Claims, No Drawings

POWDER COATING COMPOSITIONS, A PROCESS FOR THEIR PREPARATION, AND THEIR USE FOR THE COATING OF HEAT RESISTANT SUBSTRATES

CROSS-REFERENCE TO RELATED APPLICATION

This application is a Continuation-In-Part of U.S. application Ser. No. 08/013,284 filed Feb. 4, 1993 abandoned.

BACKGROUND OF THE INVENTION

1. Field of the Invention

The invention relates to new powder coating compositions based on polyacrylates having hydroxyl groups, polyesters having hydroxyl groups and aliphatic and/or cycloaliphatic polyisocyanates blocked with ketoximes, a process for their preparation, and their use for the preparation of coatings on heat-resistant substrates.

2. Description of the Prior Art

Oxime-blocked polyisocyanates and their use in powder coating compositions are known and have been disclosed, e.g., in European Patent Application 432,257 (WO 91/00267), U.S. Pat. No. 3,857,818, German Offenlegungsschrift 2,200,342 and Japanese Patent Application 70-94941, Publication Number 75-27057 (C.A. 84:107163s). Frequently these polyisocyanates are used in powder coating compositions in combination with polyesters having hydroxyl groups. However, the resulting coatings do not possess adequate stability towards light and weather and, thus, are not suitable, for example, for external applications for motor vehicles.

The combination of oxime-blocked polyisocyanates and copolymers having hydroxyl groups is also mentioned in some of these publications. The Japanese publication describes the combination of (i) xylylene diisocyanate having isocyanate groups which are partly blocked with a special oxime, and (ii) a polyacrylate having hydroxyl groups. Example 4 of U.S. Pat. No. 3,857,818 describes the combination of (i) a high-melting butanone oxime-blocked isocyanate prepolymer prepared from 4,4'-diisocyanato-dicyclohexylmethane and (ii) a polyacrylate having hydroxyl groups which are solid at room temperature.

These powder coating compositions suffer from the disadvantage that they may be stoved only at relatively high temperatures because their flow properties are poor at moderate temperatures due to the high melting points of the individual components. Frequently, these poor flow properties result in the formation of bubbles in the coatings due to the escape of the blocking agent. Furthermore, it is a disadvantage that only brittle, inflexible coatings are obtained by using this type of powder coating composition. These coatings are not suitable, for example, for painting automobiles where paints with tough, resilient and flexible properties are required.

Possible solutions to the inadequate flow properties and unacceptable flexibility of PUR powder coating compositions based on polyacrylates are described in U.S. Pat. Nos. 3,993,849 and 3,998,768. These patents describe polyol mixtures, consisting of polyacrylates having hydroxyl groups and polyesters with having hydroxyl groups, which are combined with oxime-blocked polyisocyanates as binder components. In addition, in U.S. Pat. No. 3,998,768 the polyacrylate component is based on one polyacrylate having a high glass transition temperature and one polyacrylate having a low glass transition temperature. In both patents, the total binder composition contains a proportion of polyester of at least 10% by weight and at most 30% by weight. These proportions of polyester, however, may have a negative effect on resistance to weathering, especially on the tendency of automotive top coats to yellow when used outside, so that powder coating composition binders in accordance with these U.S. patents are suitable for external use only to a limited extent.

Accordingly, it is an object of the present invention to provide new powder coating compositions which may be hardened at comparatively low temperatures of 120° to 160° C. and have excellent flowability, even at these temperatures, such that the resulting coatings are high-quality, bubble-free, and particularly resistant to solvents, chemicals, and weathering.

These objects may be achieved with the powder coating compositions according to the invention which is described in more detail hereinafter.

Surprisingly, it has been found that small proportions of polyesters having hydroxyl groups, i.e., less than 10% by weight, greatly improve the flow properties and the degree of flexibility of PUR powder coating compositions based on polyacrylates having hydroxyl groups and oxime-blocked polyisocyanates. These improvements are not obtained when using higher proportions of polyester. Instead these coatings have poorer weathering properties and an increased tendency to yellow when exposed to high temperatures.

SUMMARY OF THE INVENTION

The present invention relates to a powder coating composition having a glass transition temperature of 20° to 80° C. and containing (A) 56 to 86.9% by weight (preferably 58 to 86.9% by weight and more preferably 60 to 86.9% by weight) of a polyacrylate polyol component having a hydroxyl number of 30 to 155 and a glass transition temperature of 30° to 120° C., (B) 0.1 to 9% by weight (preferably 0.1 to 7% by weight and more preferably 0.1 to 5% by weight) of a polyester polyol component having a hydroxyl number of 40 to 180 and a glass transition temperature of −40° to 80° C., (C) 13 to 35% by weight of a polyisocyanate component having a glass transition temperature of −40° to 60° C. and containing at least one ketoxime-blocked polyisocyanate selected from (i) polyisocyanate derivatives prepared from 1,6-diisocyanatohexane and containing biuret, isocyanurate, uretdione, and/or urethane groups, (ii) polyisocyanate derivatives prepared from mixtures of 1,6-diisocyanatohexane and 1-isocyanato-3,3,5-trimethyl-5-isocyanatomethylcyclohexane and containing isocyanurate groups and optionally uretdione groups and (iii) polyisocyanate derivatives prepared from 4,4'-diisocyanatodicyclohexylmethane and containing urethane groups, and (D) at least one catalyst for the reaction between blocked isocyanate groups and hydroxyl groups, wherein i) the percentages of components (A), (B), and (C) are based on the total weight of these components and ii) components (A), (B), and (C) are present in amounts sufficient to provide an equivalent ratio of blocked isocyanate groups to hydroxyl groups of 0.5:1 to 1.5:1.

The present invention also relates to a process for the preparation of this powder coating composition by dissolving and/or homogeneously dispersing components (A), (B), (C), and (D) in an inert solvent or mixture of solvents having a boiling point or boiling range between 50° and 150° C., removing the solvent or dispersant from the solution and/or dispersion, and simultaneously and/or subsequently converting the resulting solid into the powder form.

Finally, the present invention relates to heat-resistant substrates, particularly automotive body parts, coated with this powder coating composition, especially clear coatings.

DETAILED DESCRIPTION OF THE INVENTION

Polyol component (A) has a hydroxyl number of 30 to 155 (preferably of 40 to 120) mg KOH/g and a glass transition temperature ($T_g$, determined by differential thermal analysis, DTA) of 30° to 120° C. (preferably 50° to 100° C.) and is obtained by copolymerizing a mixture of monomers selected from (a) 0 to 70 (preferably 10 to 60 and more preferably 15 to 50) parts by weight of methyl methacrylate, (b) 0 to 60 (preferably 5 to 50 and more preferably 10 to 45) parts by weight of alkyl or cycloalkyl esters of acrylic and/or methacrylic acid having 2 to 18 carbon atoms in the alkyl or cycloalkyl radical, (c) 0 to 50 (preferably 5 to 40 and more preferably 5 to 35) parts by weight of vinyl aromatic compounds, (d) 6 to 40 (preferably 10 to 35 and more preferably 10 to 30) parts by weight of hydroxyalkyl esters of acrylic and/or methacrylic acid, and (e) 0 to 5 (preferably 0.1 to 3) parts by weight of olefinically unsaturated carboxylic acids, wherein the sum of the parts by weight of components (a) to (e) is 100.

Monomers (b) are preferably (cyclo)alkyl esters of acrylic or methacrylic acid with 2 to 18 carbon atoms in the (cyclo)alkyl radical. Examples include ethyl (meth)acrylate, propyl (meth)acrylate, isopropyl (meth)acrylate, butyl (meth)acrylate, isobutyl (meth)acrylate, tert-butyl (meth)acrylate, 2-ethylhexyl (meth)acrylate, cyclohexyl methacrylate, neopentyl methacrylate, isobornyl methacrylate, 3,3,5-trimethylcyclohexyl methacrylate, and stearyl methacrylate.

Examples of monomers (c) include styrene, vinyltoluene, and α-ethylstyrene.

Suitable monomers (d) are selected from hydroxyalkyl esters of acrylic or methacrylic acid having 2 to 6 (preferably 2 to 4) carbon atoms in the hydroxyalkyl radical. Examples include 2-hydroxyethyl (meth)acrylate, hydroxypropyl (meth)acrylate (an isomeric mixture produced by the addition of propylene oxide to (meth)acrylic acid), 4-hydroxybutyl acrylate, and addition products of ε-caprolactone with these hydroxyalkyl esters. Thus, the term "hydroxyalkyl ester" should also include radicals which possess ester groups, such as those produced by the addition of ε-caprolactone to the preceding hydroxyalkyl esters. In addition, reaction products of glycidyl (meth)acrylate with saturated monocarboxylic acids, and reaction products of (meth)acrylic acid with saturated monoepoxides, which carry additional OH groups are also intended to be included by the term "hydroxyalkyl ester" of (meth)acrylic acid and, therefore, are also suitable as monomers (d).

Especially preferred for use as polyol component (A) are copolymers having hydroxyl groups produced from (a) 15 to 50 parts by weight of methyl methacrylate, (b) 10 to 45 parts by weight of alkyl esters of acrylic and/or methacrylic acid having 2 to 12 carbon atoms in the alkyl radical, (c) 5 to 35 parts by weight of styrene, (d) 10 to 30 parts by weight of 2-hydroxyethyl methacrylate and/or hydroxypropyl methacrylate, i.e., the addition product of propylene oxide with methacrylic acid, containing 2-hydroxypropyl methacrylate and 2-hydroxy-1-methylethyl methacrylate in a ratio of about 3:1, and (e) 0.1 to 3 parts by weight of acrylic acid and/or methacrylic acid, wherein the sum of the parts by weight of components (a) to (e) is 100.

When preparing copolymers having hydroxyl groups, any mixture of each of the monomers (a) to (e) may be used, provided that when preparing the copolymers, the mixtures are chosen in such a way that the resulting copolymers have hydroxyl numbers and glass transition temperatures within the previously described ranges. These ranges may be achieved when a suitable ratio of "softening" monomers (which lead to a decrease in the glass transition temperature) to "hardening" monomers (which lead to an increase in the glass transition temperature) is used when preparing the copolymers.

"Softening" monomers include alkyl esters of acrylic acid such as ethyl acrylate, butyl acrylate, isobutyl acrylate, and 2-ethylhexyl acrylate.

"Hardening" monomers include alkyl esters of methacrylic acid, such as methyl methacrylate, ethyl methacrylate, isobutyl methacrylate, cyclohexyl methacrylate, isopropyl methacrylate, tert-butyl methacrylate, neopentyl methacrylate, isobornyl methacrylate, and 3,3,5-trimethylcyclohexyl methacrylate; and vinyl aromatic compounds, such as styrene, vinyltoluene, and α-ethylstyrene.

The preparation of copolymers (A) having hydroxyl groups takes place by the radical initiated copolymerization of the previously described monomers in suitable organic solvents. The monomers are copolymerized at temperatures of 60° to 180° C. (preferably of 80° to 160° C.) in the presence of radical formers and, optionally, molecular weight regulators.

Preferably, the solvent or solvent blend used for the preparation of the copolymers is the same as that which is subsequently required to prepare the coating compositions according to the invention. These solvents have a boiling point or a boiling range within of 50° to 150° C. (preferably 75° to 130° C.) at 1013 mbar. Solvents which are suitable for preparing the copolymers and also the coating compositions include aromatic compounds such as toluene or xylene; esters such as methyl acetate, ethyl acetate, isopropyl acetate, propyl acetate, isobutyl acetate, butyl acetate, or methyl-n-amyl acetate; ketones such as 2-propanone, 2-butanone, 2-pentanone, 3-pentanone, 3-methyl-2-butanone, 4-methyl-2-pentanone, 5-methyl-2-hexanone, or 2-heptanone; and mixture of these solvents.

Preparation of the copolymers may take place continuously or batchwise. Usually, the monomer mixture and the initiator are metered regularly and continuously into a polymerization reactor while simultaneously the corresponding amount of polymer is continuously removed. Copolymers which are substantially chemically uniform may be prepared in this way. Copolymers which are substantially chemically uniform may also be prepared by introducing the reaction mixture into a stirred-tank reactor at a relatively constant rate without removing the polymer.

A portion of the monomers may also be initially introduced in solvents and the remainder of the monomers and secondary agents may be introduced separately or together into the reactor at the reaction temperature. Polymerization generally takes place at atmospheric pressure, but may also be performed at pressures up to 25 bar.

The initiators are used in amounts of 0.05 to 15% by weight, based on the total amount of monomers. Suitable initiators include aliphatic azo compounds such as azodiisobutyronitrile, azo-bis-2-methylvaleronitrile, 1,1'-azo-bis-1-cyclohexanenitrile, and alkyl 2,2'-azo-bis-isobutyrates; symmetric diacyl peroxides such as acetyl, propionyl, or butyryl peroxide, benzoyl peroxides substituted with bromo, nitro, methyl, or methoxy groups, and lauryl peroxides; symmetric peroxydicarbonates such as diethyl, diisopropyl, dicyclohexyl, and dibenzoyl peroxydicarbonate; tert-butylperoxy-2-ethyl hexanoate; tert-butyl perbenzoate; hydroperoxides such as tert-butyl hydroperoxide and cumene hydroperoxide; dialkyl peroxides such as dicumyl peroxide; tert-butylcumyl peroxide; and di-tert-butyl peroxide.

To control the molecular weight of the copolymers, known regulators are used in the preparation. Examples include tert-dodecyl mercaptan, dodecyl mercaptan, and diisopropyl xanthogenic disulfide. The regulator may be added in amounts of 0.1 to 10% by weight, based on the total amount of monomers.

Polyester polyol component (B) has a hydroxyl number of 40 to 180, an acid number of less than 12, a glass transition temperature of −40° to +80° C., and preferably an average molecular weight ($M_n$, which may be calculated from the stoichiometry of the starting materials) of 500 to 4000. To prepare the polyester polyol, the following monomer components may be used:

(a) alkanediols having a molecular weight of 62 to 500 (preferably 62 to 300), such as ethanediol, 1,2- and 1,3-propanediol, 1,2-, 1,3- and 1,4-butanediol, 1,5-pentanediol, 1,6-hexanediol, neopentylglycol, 1,4-cyclohexanediol, cyclohexane-1,4-dimethanol, and reaction products of these diols with ε-caprolactone, ethylene oxide, or propylene oxide, provided that they have the required molecular weight;

(b) alcohols having a functionality of at least 3 and a molecular weight of 92 to 500 (preferably 92 to 250), such as trimethylolpropane, glycerin, and pentaerythritol;

(c) dicarboxylic acids having a molecular weight of up to 500 (preferably 92 to 250) or their anhydrides, such as phthalic acid, phthalic anhydride, isophthalic acid, tetrahydrophthalic acid, tetrahydrophthalic anhydride, hexahydrophthalic acid, hexahydrophthalic anhydride, terephthalic acid, fumaric acid, maleic acid, maleic anhydride, succinic acid, succinic anhydride, and adipic acid, and (d) monocarboxylic acids having a molecular weight of up to 500 (preferably 116 to 300), such as benzoic acid, 2-ethylhexanoic acid, caproic acid, caprylic acid, capric acid, and lauric acid.

To prepare polyester polyols (B), various mixtures of monomer components (a) to (d) may be used, provided that these mixtures are selected such that the resulting polyesters have the required OH numbers, acid numbers, and glass transition temperatures. The values may be obtained if a suitable ratio of "softening" monomer components (which lead to a decrease in the glass transition temperature) to "hardening" monomer components (which lead to an increase in the glass transition temperature) is used when preparing the polyesters.

"Softening" monomer components include aliphatic diols such as 1,4-butanediol, 1,5-pentanediol, and 1,6-hexanediol; and aliphatic dicarboxylic acids such as succinic acid and adipic acid.

"Hardening" monomer components include cyclic aromatic dicarboxylic acids such as phthalic acid, isophthalic acid and terephthalic acid; and diols such as 1,4-cyclohexanediol, cyclohexane-1,4-dimethanol, and neopentylglycol.

Polyesters (B) may be prepared by known methods, such as those described in detail in "Ullmanns Encyclopädie der technischen Chemie", Verlag Chemie Weinheim, 4th edition (1980), vol. 19, pages 61 ff., or H. Wagner and H. F. Sarx in "Lackkunstharze", Carl Hanser Verlag, Munich (1971), pages 86–152. The esterification reaction may take place in the presence of a catalytic amount of a known esterification catalyst (e.g., acids, bases, or transition metal compounds such as titanium tetrabutyrate) at about 80° to 260° C. (preferably 100° to 240° C.). The esterification reaction is continued until the desired values for the hydroxyl number and acid number are achieved. The molecular weight of the polyester polyols may be calculated from the stoichiometry of the starting materials (taking into account the resulting hydroxyl numbers and acid values).

Polyisocyanate components (C) are preferably fully ketoxime-blocked polyisocyanate derivatives which, in blocked form, have a glass transition temperature ($T_g$, determined by differential thermal analysis, DTA) of −40° to +60° C. (preferably −45° to +45° C. and more preferably −40 ° to +20° C.); an average functionality of 2.0 to 5.0 (preferably 2.0 to 4.5); and a blocked isocyanate group content (calculated as NCO, molecular weight 42) of 5.0 to 20.0% by weight (preferably 8.0 to 18.0% by weight).

Polyisocyanate component (C) contains at least one ketoxime-blocked polyisocyanate selected from (i) polyisocyanate derivatives prepared from 1,6-diisocyanatohexane and containing biuret, isocyanurate, uretdione, and/or urethane groups, (ii) polyisocyanate derivatives prepared from 1,6-diisocyanatohexane and 1-isocyanato-3,3,5-trimethyl-5-isocyanatomethylcyclohexane and containing isocyanurate and optionally uretdione groups, wherein the diisocyanates are present in a ratio by weight of 5:1 to 1:5 and (iii) polyisocyanate derivatives prepared from 4,4'-diisocyanato-dicyclohexylmethane containing urethane groups. It is also possible to use those ketoxime-blocked polyisocyanates which contain several of the previously described groups in the same molecule.

Prior to blocking, the unblocked polyisocyanates preferably have a maximum residual amount of 1.0% by weight (preferably a maximum of 0.5% by weight) of the diisocyanate used for their preparation. Particularly preferred for use as component (C) are butanone oxime-blocked biuret polyisocyanates or isocyanurate polyisocyanates prepared from 1,6-diisocyanatohexane and/or urethane group-containing polyisocyanates prepared from 4,4'-diisocyanato-dicyclohexylmethane.

The polyisocyanate derivatives may be prepared in known manner by the biuretization, dimerization, trimerization, or urethanization of the corresponding monomeric diisocyanates. These methods are described in the following publications:

Polyisocyanates containing biuret groups: DE-PS 1,101, 394, DE-PS 1,570,632, DE-OS 2,308,015, DE-OS 2,437,130, DE-OS 2,654,745, DE-OS 2,803,103, DE-OS 2,808,801, DE-OS 2,918,739, DE-OS 3,007, 679, DE-OS 3,403,277, DE-OS 3,403,278, DE-PS 3,700,209, and EP-A 3505.

Polyisocyanates containing uretdione groups: DE-OS 502 934.

Polyisocyanates containing urethane groups: U.S. Pat. No. 3,183,112.

Polyisocyanates containing isocyanurate groups: DE-AS 1,667,309, DE-OS 3,100,262, DE-OS 3,219,608, DE-OS 3,240,613, EP-A 10,589, EP-A 57,653, EP-A 89,297, and EP-A 187,105.

Polyisocyanates containing urethane and isocyanurate groups: EP-A 155,559 and DE-OS 3,811,350.

Polyisocyanates containing urethane and biuret groups: EP-A 320,703.

Suitable ketoximes for blocking the polyisocyanates are selected from those having a molecular weight of 73 to 200. Examples include ketoximes prepared from aliphatic or cycloaliphatic ketones such as 2-propanone, 2-butanone, 2-pentanone, 3-pentanone, 3-methyl-2-butanone, 4-methyl-2-pentanone, 3,3-dimethyl-2-butanone, 2-heptanone, 3-heptanone, 4-heptanone, 5-methyl-3-heptanone, 2,6-dimethyl-4-heptanone, cyclopentanone, cyclohexanone, 3-methylcyclohexanone, 3,3,5-trimethylcyclohexanone, and 3,5,5-trimethyl-2-cyclohexen-5-one. Preferred blocking agents are acetone oxime, butanone oxime, and cyclohexanone oxime.

The blocking of the isocyanate groups with the previously mentioned blocking agents may take place at a reaction temperature of 20° to 120° C. (preferably 20° to 80° C.). The blocking reaction may be performed either solvent-free or in an inert, organic solvent such as those previously described.

The catalysts (D) are selected from those which promote the addition reaction between hydroxyl and isocyanate groups, for example, metal compounds, especially organic tin compounds, and tertiary amines. Preferred organic tin compounds include tin(II) salts of carboxylic acids such as tin(II) acetate, tin(II) octanoate, tin(II) ethylhexanoate, or tin(II) laurate, and tin(IV) compounds such as dibutyltin oxide, dibutyltin dichloride, dibutyltin diacetate, dibutyltin dilaurate, dibutyltin maleate, and dioctyltin diacetate. Mixtures of these catalysts may also be used. Examples of suitable tertiary amines include diazabicyclo[2.2.2]octane and 1,5-diazabicyclo[4.3.0]non-5-ene.

Additional examples of suitable catalysts and details concerning the mechanism of these catalysts are described in Kunststoff-Handbuch vol. VII, published by Vieweg and H öchtlen, Carl-Hanser-Verlag, Munich, 1966, for example, on pages 96 to 102.

Especially preferred catalysts are tin(II) octanoate and/or dibutyltin(IV) dilaurate.

The catalysts are used in an amount of 0.1 to 5, preferably 0.2 to 3% by weight, based on the solids content of components (A) to (C).

Optional additives and auxiliaries (E) include those which may be dissolved or dispersed in the solvents used to prepare the powder coating compositions according to the invention. Examples include flow-control agents such as polybutylacrylate or those based on polysilicones; light stabilizers such as sterically hindered amines; and UV absorbers such as benztriazole and benzophenone.

To perform the process according to the invention, components (A) to (D) and optionally (E) are dissolved or dispersed in an inert organic solvent or mixture of solvents such that the resulting solutions or dispersions have a solids content of 10 to 80% by weight (preferably 30 to 60% by weight). Preferably, the solvent or solvent blend used is the one which has previously been used to prepare the copolymer (A) and/or optionally was first used to dissolve polyisocyanate component (C). When preparing these solutions, the amounts of components (A) to (C) are selected to provide an equivalent ratio of blocked isocyanate groups in component (C) to hydroxyl groups in components (A) and (B) of 0.5:1 to 1.5:1 (preferably 0.8:1 to 1.2:1).

The resulting solutions or dispersions are subjected to a solvent removal process wherein the solvent or solvent mixture is removed as completely as possible. Suitable solvent removal processes include spray-drying, degassing in special or commercial evaporation extruders or coiled tube evaporators, and distillation under a moderate to high vacuum. If the solvent removal process does not immediately produce processable powders, the resulting solids are powdered in known manner after removing the solvent. Finally, the powder which is produced, either directly during removal of the solvent or by milling after removal of the solvent, may optionally be freed from coarse fractions (for instance, fractions with a particle diameter of more than 0.1 mm) by screening.

The clear powder coating composition which is obtained has a glass transition temperature ($T_g$, as determined by differential thermal analysis, DTA) of 20° to 80° C. (preferably 25° to 75° C). This essential condition for the powder coating compositions according to the invention is fulfilled by choosing a suitable ratio, with regard to glass transition temperatures, of components (A) to (C) when preparing the powder coating compositions. For instance, if the blocked polyisocyanate component (C) has a glass transition temperature of less than 25° C., a copolymer (A) having a higher glass transition temperature (e.g., 80° C.) is used as the binder component so that the final powder coating composition has the a glass transition temperature within the required range.

The clear powder coating compositions obtained according to the invention may, if so desired, be fused in suitable extruders or kneaders and mixed and homogenized with other auxiliaries or additives, particularly inorganic or organic pigments. When pigmented powder coating compositions are prepared in this manner, the optionally required powdering of the solids preferably takes place after they are combined with the pigments.

The powder coating compositions may be applied to the heat-resistant substrates using known powder application processes such as electrostatic spraying or whirl sintering. The coating may be hardened by heating to a temperature of 120° to 200° C. (preferably 120° to 160° C.). Scratch-resistant coatings are thereby obtained which are resistant to solvents and chemicals, have very good optical and mechanical properties, have particularly good resistance to light and weathering, and thus are particularly suitable for external applications. Any heat-resistant substrate, such as glass or metals, may be coated. A preferred area of use for powder coating compositions according to the invention, especially in unpigmented form, is the preparation of clear automotive coatings.

The invention is further illustrated but is not intended to be limited by the following examples in which all parts and percentages are by weight unless otherwise specified.

EXAMPLES

1. Procedure for Preparing Hydroxyl Group-containing Copolymers $A_1$ and $A_2$

Part I was initially introduced into a 25 liter special steel pressurized reactor having stirring, cooling, and heating devices and an electronic temperature control system and heated to the reaction temperature. Part II (added over a total period of 4 hours) and Part III (added over a total period of 5 hours) were then metered in, in parallel and at constant temperature. Stirring was continued for 2 hours at the stated temperature. The polymer solutions obtained were then ready for mixing with components (B), (C), (D) and optionally (E).

The reaction temperatures and compositions of Parts I to III are set forth in Table 1, together with properties of the resulting copolymers.

TABLE 1

| Hydroxyl group-containing copolymers | | |
|---|---|---|
| Copolymer | $A_1$ | $A_2$ |
| Part I | | |
| Toluene | 9000 | 9000 |
| Part II | | |
| Methyl methacrylate | 3660 | 4328 |
| Butyl methacrylate | 2374 | 2690 |
| Styrene | 1868 | 1258 |
| 2-Hydroxyethyl methacrylate | 1892 | 1418 |
| Acrylic acid | 100 | 98 |
| Part III | | |
| tert-Butylperoxy-2-ethyl hexanoate (70% solution in isododecane) | 438 | 582 |
| Toluene | 668 | 626 |
| Polymerization temperature (°C.) | 125 | 110 |
| Solids content (%) | 50.7 | 50.1 |
| Viscosity at 23° C. (mPa · s) | 1880 | 1320 |
| OH number (solid resin) | 80 | 60 |
| Acid number (solid resin) | 7.4 | 4.8 |
| Glass transition temperature (°C.) | 67 | 66 |

2. Procedure for Preparing Hydroxyl Group-containing Polyesters $B_1$ and $B_2$ The components were weighed into a 15 liter reactor fitted with a stirrer, heater, automatic temperature control, column, and receiving flask, and heated to 100° to 150° C. An inhomogeneous but readily stirrable melt was produced. After 1 to 2 hours the temperature was increased to 200° C. over a period of 4 to 8 hours while water was distilled off. The melt was now homogeneous and clear. Afterwards, a catalytic amount of an esterification catalyst (titanium tetrabutyrate) was added and the esterification reaction proceeded under reduced pressure. The pressure was reduced to 10 to 20 mbar over a period of 6 to 8 hours and the reaction mixture was continually stirred under these conditions until the desired acid number was obtained.

The colorless to pale yellow polyester resins were clear when dissolved in the known paint solvents. The compositions and properties of the polyesters obtained are set forth in Table 2.

TABLE 2

| Hydroxyl group-containing polyesters | | |
|---|---|---|
| Polyester | $B_1$ | $B_2$ |
| 1,6-Hexanediol | 4183 | 1157 |
| Neopentylglycol | | 1531 |
| Cyclohexanedimethanol | | 2116 |
| Trimethylolpropane | 1188 | 1311 |
| Isophthalic acid | 3678 | |
| Phthalic anhydride | 656 | |
| Adipic acid | 1295 | 3129 |
| Maleic anhydride | | 1729 |
| Acid number | 3 | 1 |
| OH number | 143 | 145 |

TABLE 2-continued

| Hydroxyl group-containing polyesters | | |
|---|---|---|
| Polyester | $B_1$ | $B_2$ |
| Molecular weight ($M_n$) | 1500 | 1700 |
| Glass transition temperature (°C.) | −25 | −29 |

3. Polyisocyanates (C) Blocked with Butanone Oxime Polyisocyanate $C_1$ 955 parts of a polyisocyanate containing biuret groups (prepared from 1,6-diisocyanatohexane and having an NCO content of about 22.0%) and 460 parts of toluene were weighed into a 4 liter four-necked flask equipped with stirrer, reflux condenser, thermometer, and dropping funnel. 445 parts of butanone oxime were then added dropwise with stirring over a period of 1 hour at 25° C. Stirring was then continued at 25° C. until no more NCO groups were detected using IR spectroscopy. The 75% strength solution obtained had a viscosity of 5870 mPa.s at 23° C. and a blocked NCO content of 11.3% (calculated as NCO). At this time, it was suitable for mixing with polyol components (A) and (B). On a solvent-free basis, the blocked polyisocyanate had a glass transition temperature ($T_g$) of 3.1° C.

Polyisocyanate $C_2$

Polyisocyanate $C_2$ was prepared using the procedure set forth for Polyisocyanate $C_1$ from 972 parts of a polyisocyanate containing isocyanurate groups (prepared from 1,6-diisocyanatohexane and having an NCO content of about 21.5%), 470 parts of toluene, and 445 parts of butanone oxime. A 75% strength solution was obtained which had a viscosity of 1590 mPa.s at 23° C. and a blocked NCO content of 11.2% (calculated as NCO). On a solvent-free basis, the blocked polyisocyanate had a glass transition temperature $T_g$ of −2.2° C.

Polyisocyanate $C_3$ 963 parts of 4,4'-diisocyanatodicyclohexylmethane was initially weighed into a 3 liter four-necked flask with stirrer, reflux condenser, thermometer, and dropping funnel. 320 parts of butanone oxime was then added dropwise with stirring over a period of 1 hour, the addition beginning at room temperature. The resulting exothermic reaction was kept below 80° C. by cooling. After a further 20 minutes stirring at 80° C., the calculated NCO content of 12.0% was obtained. 217 parts of 1,6-hexanediol were then added in portions at 80° to 100° C. over the course of 30 minutes, after which stirring was continued for about 4 to 6 hours at 100° to 110° C. After disappearance of the NCO bands in the IR spectrum, the melt was poured onto a sheet of metal and allowed to cool down. A pale solid resin having a blocked NCO content of 10.3% (calculated as NCO) and a melting point of 70° C. was obtained.

4. Process According to the Invention and Use of the Powder Coating Composition According to the Invention To formulate the powder coating compositions according to the invention, polyacrylate polyols (A), polyester polyols (B), blocked polyisocyanates (C), catalysts (D), toluene as a secondary solvent, and, optionally, other secondary agents (E) were mixed for 1 hour at 60° C. in a 3 liter three-necked flask equipped with stirrer, reflux condenser, and thermometer. Pale, clear or slightly turbid solutions resulted. The solutions obtained in this way were optionally diluted further with solvent and then freed completely of solvent in a commercial spray dryer. Powder coating compositions according to the invention were produced directly in the form of a processable powder. The powders were optionally freed of fractions having a particle diameter of more than 0.1 mm by screening, then applied to test metal sheets using an electrostatic spraying device, and finally hardened for 30 minutes at 140° C.

High-gloss, solvent-resistant, bubble-free coatings were obtained from the powder coating compositions according to the invention. The coatings possessed the tough and resilient mechanical properties of known polyurethane coatings.

The solvent resistance of about 50 μm thick coatings was determined by a rubbing test using an acetone-soaked cotton-wool ball. The number of double rubs before the coating exhibited any visible changes is set forth hereinafter. However, no more than 50 double rubs were performed on each coating.

The formulations and the test results obtained are set forth in Table 3.

TABLE 3

Powder coating compositions according to the invention

| | Application Examples | | | | |
|---|---|---|---|---|---|
| | 1 | 2 | 3 | 4 | Comparison |
| Polyacrylate $A_1$ | 1375 | 1375 | 1375 | | 1376 |
| Polyacrylate $A_2$ | | | | 1300 | |
| Polyester $B_1$ | 36 | 36 | | 36 | |
| Polyester $B_2$ | | | 36 | | |
| Polyisocyanate $C_1$ | | 405 | | | |
| Polyisocyanate $C_2$ | 415 | | 415 | | 378 |
| Polyisocyanate $C_3$ | | | | 327 | |
| Toluene | 360 | 260 | 360 | 380 | 360 |
| Catalyst $D_1$ (tin(II) octanoate) | | 10 | | | 10 |
| Catalyst $D_2$ (dibutyltin dilaurate) | 10 | | 10 | 10 | |
| Additive E (Perenol F 45*) | 5 | 5 | 5 | 5 | 5 |
| Glass transition temperature (°C.) | 27 | 34 | 27 | 38 | 32 |
| Cupping index (mm) | 8.7 | 7.8 | 8.1 | 8.3 | 4.6 |
| Gloss (60° C., Gardner) | 100 | 98 | 96 | 97 | 96 |
| Acetone rubbing test, number of double rubs | 50 | 50 | 50 | 50 | 50 |

*Perenol F 45 is a commercial flow-control agent based on a polyacrylate available from Henkel Co., Dusseldorf, Germany The coating of the comparison example, which was prepared from a composition which did not contain a polyester polyol, had a much poorer Erichsen cupping index than coatings prepared from the powder coating compositions according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition having a glass transition temperature of 20° to 80° C. and comprising
   (A) 56 to 86.9% by weight of a polyacrylate polyol component having a hydroxyl number of 30 to 155 and a glass transition temperature of 30° to 120° C.,
   (B) 0.1 to 7% by weight of a polyester polyol component having a hydroxyl number of 40 to 180 and a glass transition temperature of −40° to 80° C.,
   (C) 13 to 35% by weight of a polyisocyanate component having a glass transition temperature of −40° to 60° C. and comprising at least one ketoxime-blocked polyisocyanate selected from (i) polyisocyanate prepared from 1,6-diisocyanatohexane and containing isocyanurate, uretdione, and/or urethane groups, (ii) polyisocyanate prepared from mixtures of 1,6-diisocyanatohexane and 1-isocyanato-3,3,5-trimethyl-5-isocyanato-methylcyclohexane and containing isocyanurate groups and optionally uretdione groups and (iii) polyisocyanate prepared from 4,4'-diisocyanato-dicyclohexylmethane and containing urethane groups, and
   (D) at least one catalyst for the reaction between blocked isocyanate groups and hydroxyl groups, wherein i) the percentages of components (A), (B) and (C) are based on the total weight of said components and ii) components (A), (B) and (C) are present in amounts sufficient to provide an equivalent ratio of blocked isocyanate groups to hydroxyl groups of 0.5:1 to 1.5:1.

2. The powder coating composition of claim 1 wherein polyacrylate polyol component (A) comprises a polyacrylate polyol prepared from
   (a) 0 to 70 parts by weight of methyl methacrylate,
   (b) 0 to 60 parts by weight of one or more alkyl or cycloalkyl esters of acrylic or methacrylic acid having 2 to 18 carbon atoms in the alkyl or cycloalkyl radical,
   (c) 0 to 50 parts by weight of one or more vinyl aromatic compounds,
   (d) 6 to 40 parts by weight of one or more hydroxyalkyl esters of acrylic or methacrylic acid, and
   (e) 0 to 5 parts by weight of one or more olefinically unsaturated carboxylic acids, wherein the sum of the parts by weight of components (a) to (e) is 100.

3. The powder coating composition of claim 2 wherein polyacrylate polyol component (A) comprises a polyacrylate polyol prepared from
   (a) 10 to 60 parts by weight of methyl methacrylate,
   (b) 5 to 50 parts by weight of one or more alkyl or cycloalkyl esters of acrylic or methacrylic acid having 2 to 18 carbon atoms in the alkyl or cycloalkyl radical,
   (c) 5 to 40 parts by weight of one or more vinyl aromatic compounds,
   (d) 10 to 35 parts by weight of one or more hydroxyalkyl esters of acrylic or methacrylic acid, and
   (e) 0 to 5 parts by weight of acrylic acid and/or methacrylic acid, wherein the sum of the parts by weight of components (a) to (e) is 100.

4. The powder coating composition of claim 2 wherein component (e) is present in an amount of 0.1 to 3 parts by weight.

5. The powder coating composition of claim 3 wherein component (e) is present in an amount of 0.1 to 3 parts by weight.

6. The powder coating composition of claim 1 wherein component (B) is present in an amount of 0.1 to 5% by weight.

7. The powder coating composition of claim 1 wherein polyester polyol component (B) has an average molecular weight ($M_n$) of 500 to 4000 and an acid value of less than 12 and comprises one or more polyester polyols.

8. The powder coating composition of claim 2 wherein polyester polyol component (B) has an average molecular weight ($M_n$) of 500 to 4000 and an acid value of less than 12 and comprises one or more polyester polyols.

9. The powder coating composition of claim 3 wherein polyester polyol component (B) has an average molecular weight ($M_n$) of 500 to 4000 and an acid value of less than 12 and comprises one or more polyester polyols.

10. The powder coating composition of claim 1 wherein polyisocyanate component (C) has a ketoxime-blocked isocyanate group content (calculated as NCO) of 5 to 20% by weight and an (average) NCO functionality of 2.0 to 5.0.

11. The powder coating composition of claim 1 wherein component (C) comprises at least one butanone oxime-blocked polyisocyanate selected from the group consisting of polyisocyanates containing isocyanurate groups and prepared from hexamethylene diisocyanate and polyisocyanates containing urethane groups and prepared from 4,4'-diisocyanato-dicylohexylmethane.

12. The powder coating composition of claim 2 wherein component (C) comprises at least one butanone oxime-blocked polyisocyanate selected from the group consisting of polyisocyanates containing isocyanurate groups and prepared from hexamethylene diisocyanate and polyisocyanates containing urethane groups and prepared from 4,4'-diisocyanato-dicylohexylmethane.

13. The powder coating composition of claim 7 wherein component (C) comprises at least one butanone oxime-blocked polyisocyanate selected from the group consisting of polyisocyanates containing isocyanurate groups and prepared from hexamethylene diisocyanate and polyisocyanates containing urethane groups and prepared from 4,4'-diisocyanato-dicylohexylmethane.

14. The powder coating composition of claim 9 wherein component (C) comprises at least one butanone oxime-blocked polyisocyanate selected from the group consisting of polyisocyanates containing isocyanurate groups and prepared from hexamethylene diisocyanate end polyisocyanates containing urethane groups and prepared from 4,4'-diisocyanato-dicylohexylmethane.

15. The powder coating composition of claim 1 wherein catalyst (D) comprises tin(II) octanoate and/or dibutyltin(IV) dilaurate.

16. The powder coating composition of claim 1 which additionally contains one or more flow-control agents and/or one or more light stabilizers.

17. A process for the preparation of the powder coating composition of claim 1 which comprises dissolving and/or homogeneously dispersing components (A), (B), (C), and (D) in an inert solvent or mixture of solvents having a boiling point or boiling range between 50° and 150° C., removing the solvent or dispersant from the solution and/or dispersion and simultaneously and/or subsequently converting the resulting solid into the powder form.

18. A heat-resistant substrate coated with a powder coating composition having a glass transition temperature of 20° to 80° C. and comprising (A) 56 to 86.9% by weight of a polyacrylate polyol component having a hydroxyl number of 30 to 155 and a glass transition temperature of 30° to 120° C., (B) 0.1 to 7% by weight of a polyester polyol component having a hydroxyl number of 40 to 180 and a glass transition temperature of −40° to 80° C., (C) 13 to 35% by weight of a polyisocyanate component having a glass transition temperature of −40° to 60° C. and comprising at least one ketoxime-blocked polyisocyanate selected from (i) polyisocyanate prepared from 1,6-diisocyanatohexane and containing isocyanurate, uretdione, and/or urethane groups, (ii) polyisocyanate prepared from mixtures of 1,6-diisocyanatohexane and 1-isocyanato-3,3,5-trimethyl-5-isocyanato-methylcyclohexane and containing isocyanurate groups and optionally uretdione groups and (iii) polyisocyanates prepared from 4,4'-diisocyanato-dicyclohexylmethane and containing urethane groups, and (D) at least one catalyst for the reaction between blocked isocyanate groups and hydroxyl groups, wherein i) the percentages of components (A), (B), and (C) are based on the total weight of said components and ii) components (A), (B), and (C) are present in amounts sufficient to provide an equivalent ratio of blocked isocyanate groups to hydroxyl groups of 0.5:1 to 1.5:1.

19. The substrate of claim 18 wherein component (B) is present in an amount of 0.1 to 5% by weight.

20. The substrate of claim 18 wherein the substrate is an automotive body part and the coating is clear.

* * * * *